3,749,696
NOVEL CATALYST SYSTEMS IN HIGH MOLECULAR WEIGHT POLYESTERS
Eugene E. Berkau, Cincinnati, Ohio, assignor to Monsanto Company, St. Louis, Mo.
Filed Aug. 26, 1970, Ser. No. 66,957
Int. Cl. C08g 17/015
U.S. Cl. 260—75 R
3 Claims

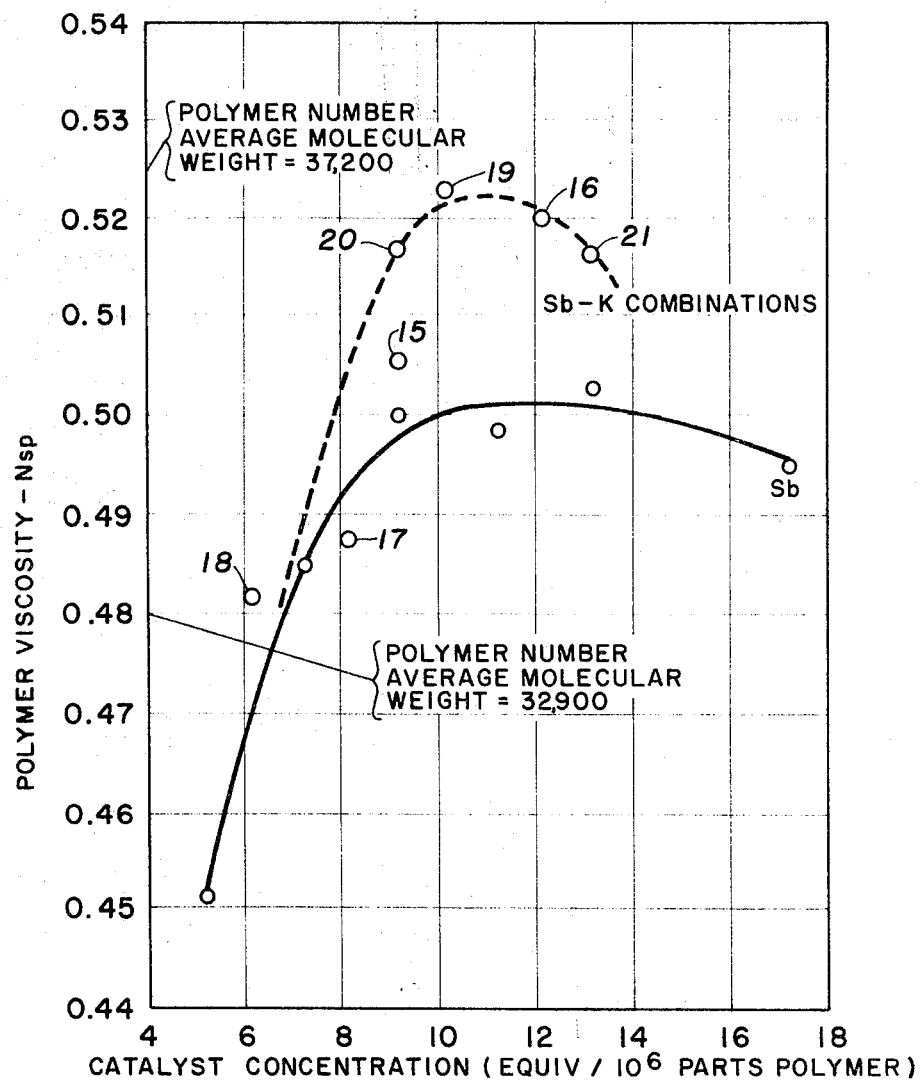

ABSTRACT OF THE DISCLOSURE

In the production of ultra-high molecular weight, thermally stable polyethylene terephthalate, pre-polymers of polyethylene terephthalate comprising oligomers of terephthalic acid and ethylene glycol and mono and bis-esters of terephthalic acid and ethylene glycol are transesterified in the presence of complementary catalytic amounts of antimony, and alkali metal salts of a weak acid, or hydroxide.

BACKGROUND

It is well known that polymeric polyesters prepared by the condensation of a dihydric alcohol or a functional derivative and a dibasic carboxylic acid or a polyester-forming derivative thereof, such as an acid halide, a salt, or a simple ester of a dibasic acid and a volatile mono-hydric alcohol are excellent fiber-forming polymers. Commercially, the most important of the highly polymeric polyesters is that prepared by the condensation of terephthalic acid or dimethyl terephthalate and a polymethylene glycol containing from 2 to 10 carbon atoms, and particularly ethylene glycol. These polyesters are relatively insoluble, chemically inactive, hydrophobic materials capable of being formed into filaments which can be cold-drawn to produce textile fibers of superior strength and pliability.

More specifically, it is well known to prepare polyethylene terephtalate by directly esterifying terephthalic acid with ethylene glycol followed by the polycondensation of the product thereof. It is well known to conduct the esterification reaction in the presence of an alkaline substance such as the organic alkalis (U.S. Pat. 3,050,-548), the alkali metal salts of terephthalic acid (British Pat. No. 782,036), the alkaline earth metal salts of terephthalic acid (British Pat. 835,442), tertiary amines (U.S. Pat. 3,444,140). It is also known to use quarternary ammonium compounds in conjunction with certain metal-containing catalysts to prevent the formation of ether bonds (U.S. Pat. 3,325,454).

Polycondensation or transesterification of bis(hydroxyalkyl) terephthalates using antimony compounds and particularly antimony glycoloxide is also well known in the art (British 740,381 and 805,534). Many transesterification catalysts systems have been shown to be suitable for the transesterification of the monomeric bis-ester of the dicarboxylic acid, but questionable for use with the pre-polymer obtained in the direct esterification of terephthalic acid and ethylene glycol which comprises oligomers of the acid in the glycol as well as the mono and bis-esters of the acid and glycol (see for example U.S. Pat. 3,070,575).

Many factors are involved in the selection of a polyester catalyst. The ideal catalyst would be one that increases the rate of polymerization of terephthalic acid and ethylene glycol to a commercially practicable rate without any undesirable side reactions, and which would not catalyze the depolymerization of the polymer after it has been spun into fiber. In practice, some catalysts do not increase the polymerization reaction to any significant degree; others lead to a rate of cross-linking which may be too fast for convenience. Some catalysts catalyze the formation of small amounts of diethylene glycol which is then co-polymerized into the polyester, with undesirable consequences.

The most critical stage in the production of ultra-high molecular weight polyester polymer is the polycondensation reaction that occurs in the final reaction vessels, commonly referred to as "finishers." Herein, the glycol terminated molecules react together with the aid of a polycondensation catalyst such as, for example, antimony glycoloxide, to yield a higher molecular weight polyester and a glycol molecule. At this point in the process, polyesterification is also occurring but at a relatively slow rate. Since the polycondensation or transesterification reaction is reversible, it is necessary that the released glycol molecule be removed from the reacting mass as quickly as possible. Although seemingly a simple reaction-diffusion process, the removal is complicated by the phenomenal increase in melt viscosity as the polymer molecular weight increases. Commercial finishers have been developed to obtain maximum renewal of the polymer surface and maximum transport of the polymer with a corresponding minimum of power input to reduce heat degradation. Catalysts which cause a faster rate of reaction do result in a higher concentration of released glycol molecules, thus increasing the rate of diffusion and the speed of the process. There are a number of catalysts, only a few of which are cited above, which provide a relatively fast rate of reaction. Many of these at the same time excessively promote thermal degradation.

It is an object of this invention to provide a polycondensation catalyst system suitable for the production of ultra-high molecular weight, thermally stable polyethylene terephthalate from pre-polymers of polyethylene terephthalate comprising oligomers of terephthalic acid and ethylene glycol, and mono and bis-esters of terephthalic acid and ethylene glycol.

It is another object of this invention to provide an improved process for the production of ultra-high molecular weight polyester polymers.

Briefly, the objects of this invention are accomplished by the use of a complementary catalytic system comprising antimony and an alkali metal salt of a weak acid or hydroxide, preferably a member of the group consisting of lithium carbonate, lithium acetate, sodium carbonate, potassium carbonate, and lithium hydroxide. To further understand the invention, reference will be made to the attached drawing wherein the figure shows the effect of using the catalyst system of this invention on polymer viscosity.

In the light of the background described above, and relevant to the instant invention, it has been determined:

First, that antimony is probably the most desirable polycondensation catalyst; and Second, that there is an antimony concentration in the polymer above which no further increase in the extent or rate of polymerization is obtained.

This response is characteristic of most polycondensation catalysts. Thus, a further increase in the rate of polymerization would seem to require a catalyst system rather than an individual catalyst; and a system where the effects of the various catalysts are complementary.

I have discovered that certain alkali metal salts of weak acids and hydroxides, including lithium carbonate, lithium acetate, sodium carbonate, potassium carbonate, and lithium hydroxide, many of which are well known to have been used as esterification catalysts, are effective, when used in conjunction with antimony glycoloxide, as a transesterification or condensation catalyst, to provide polymer viscosities higher than could be obtained with the catalysts used individually. This synergistic or complementary effect was not limited to the alkali metals listed, but applied, as well, to the corresponding cobalt salts, and others which are not included specifically as a part of this invention because cobalt, for example, contributes to the thermal decomposition of the polymer melt. The lithium salt of sulfuric acid showed no effect on the condensation reaction; hence, the form of the alkali metals used is limited to salts of weak acids and hydroxides.

A most important observation concerning the instant invention is that it is applicable to the condensation or transesterification reaction of ultra-high molecular weight polyethylene terephthalate only, that is to say, polymers of a number average molecular weight order of above about 32,900; while no appreciable effect has been shown on lower molecular weight polymers of the order of below about 32,900. According to a preferred embodiment, antimony is present in the polyethylene terephthalate in the range of from about 250–350 parts per million, with a catalytic equivalency of about 6–9 per million parts of the polyethylene terephthalate. The alkali metal salts of weak acids and hydroxides are present in the polyethylene terephthalate in a catalytic equivalency of about 2–4 per million parts of the polyethylene terephthalate. By "catalytic equivalents" is meant [weight of metal (gms.) × valence]/atomic weight of metal. This is a commonly used term to express the amounts of catalysts in terms of their functional groups.

The transesterification or polycondensation catalyst system of this invention may be present in the direct esterification reaction phase of the process, with predictably favorable effects. There is, of course, some transesterification taking place during the so-called esterification phase of the direct, as opposed to the indirect process. There is also a known catalytic effect of the alkali metals on esterification. Further, a carbonate ion, an acetate ion, and possibly other basic ions improve buffering and may cause additional lowering of the diethylene glycol formation. However, it is not necessary that the polycondensation catalyst system be present during esterification for the practice of this invention.

Examples

The following examples will provide a better understanding of this invention, it being understood that these examples are intended to be merely illustrative of the invention and not a limitation thereon. Unless otherwise specified, all parts are by weight. All examples employed a stirred tank reactor in which primarily direct esterification took place, a bubble cap column with an inert gas (nitrogen) sweep was used to increase molecular weight with elimination of most glycol and water. The pre-polymer was then introduced into a vacuum devolatizer or finisher of the basket type for the further polymerization of the pre-polymers into high molecular weight polymers. The construction and operation of these vessels are not considered critical to the practice of this invention and are conventional and well known in the art. The operating conditions were maintained constant and were as shown at Table I. It will be noted that titanium dioxide was used throughout. This is a common polyester additive with no known catalytic effect on either esterification or polymerization. The amounts of ethylene glycol and terephthalic acid shown in Table I correspond to a mole ratio of ethylene glycol to terephthalic acid of 2/1.

TABLE I.—REACTION CONDITIONS

| | |
|---|---|
| Flushout period (hours) | 24 |
| Esterification: | |
| Reactor: | |
| Temperature (° C.) | 270 |
| Pressure (p.s.i.g.) | 20 |
| Agitator (r.p.m.) | 700 |
| Hold-up (gm.) | 4500 |
| Residence time (hours) | 1.9 |
| Column: | |
| Tray temperature (° C.) | 290 |
| Bottoms temperature (° C.) | 265 |
| ($N_2$)/TA (mole/mole) | 2.0 |
| $N_2$ rate (cc./min.) | 9600 |
| Residence time (hours) | 2.0 |
| Finisher: | |
| Dowtherm temperature (° C.) | 290 |
| Agitator (r.p.m.) | 5 |
| Residence time (hours) | 2.0 |
| Throughput (lbs./hour) | 5.0 |
| Finisher pressure (mm. Hg) | 1.0 |
| Slurry formulation: | |
| Ethylene glycol (lbs.) | 30 |
| Terephthalic acid (lbs.) | 40 |
| Antimony glycoloxide (gm.) | [1] 10.80 |
| Titanium dioxide (gm.) | [2] 5.00 |

[1] 292 p.p.m. Sb.
[2] 240 p.p.m. $TiO_2$.

The figures shown in Tables II and III were obtained by adding the metal compounds shown to the slurry, and allowing 24 hours for the process to run and flush out before sampling the contents of each vessel. The 24 hour period is equivalent to four residence periods during the continuous process. The primary response, polymer solution viscosity, was measured analytically by methods well known in the art.

Specific viscosity, as employed herein, is represented by the formula:

$$N_{sp} = \frac{\text{Time of flow of the polymer solution in seconds}}{\text{Time of flow of the solvent in seconds}} - 1$$

Viscosity determinations of the polymer solutions and solvent are made by allowing said solutions and solvent to flow by force of gravity at about 25° C. through a capillary viscosity tube. In all determinations of polymer solution viscosities, a solution containing 0.5 percent by weight of the polymer dissolved in a solvent mixture containing two parts by weight of phenol and one part by weight of 2,4,6-trichlorophenol, based on the total weight of the mixture is employed. Changes in polymer molecular weight were monitored by the torque on the finisher cage, and the pressure drop in the transfer line from the finisher to the spinnerette. Polymer melt viscosity is directly related to the pressure drop and the torque on the finisher cage. Polymer melt viscosity is directly related to polymer molecular weight and solution viscosity.

TABLE II.—CATALYTIC ACTIVITY OF VARIOUS METAL SALTS AND HYDROXIDES

| Catalyst, theoretical concentration in polymer | Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| $Sb_2GO_3$ (gm. in slurry) | 10.8 | 10.8 | 10.8 | 10.8 | 10.8 | 10.8 | 10.8 | 10.8 | 10.8 | 10.8 | 10. | 10.8 | 10.8 | 10.8 |
| Sb: | | | | | | | | | | | | | | |
| P.p.m.[1] | 292 | 292 | 292 | 292 | 292 | 292 | 292 | 292 | 292 | 292 | 292 | 292 | 292 | 292 |
| Eq./m | 7.1 | 7.1 | 7.1 | 7.1 | 7.1 | 7.1 | 7.1 | 7.1 | 7.1 | 7.1 | 7.1 | 7.1 | 7.1 | 7.1 |
| $LiCO_3$ (gm. in slurry) | | 1.56 | | | | | | | | | | | | 1.56 |
| Li: | | | | | | | | | | | | | | |
| P.p.m | | 14 | | | | | | | | | | | | 14 |
| Eq./m | | 2.0 | | | | | | | | | | | | 2.0 |
| LiOAc (gm. in slurry) | | | | 4.32 | | | | | | | | | | |
| Li: | | | | | | | | | | | | | | |
| P.p.m | | | | 14 | | | | | | | | | | |
| Eq./m | | | | 2.0 | | | | | | | | | | |
| $Na_2CO_3$ (gm. in slurry) | | | | | | 0.68 | 2.24 | | | | | | | |
| Na: | | | | | | | | | | | | | | |
| P.p.m | | | | | | 14 | 46 | | | | | | | |
| Eq./m | | | | | | 0.6 | 2.0 | | | | | | | |
| $K_2CO_3$ (gm. in slurry) | | | | | | | | 2.90 | | | | | | |
| K: | | | | | | | | | | | | | | |
| P.p.m | | | | | | | | 78 | | | | | | |
| Eq./m | | | | | | | | 2.0 | | | | | | |
| $CoCO_3$ (gm. in slurry) | | | | | | | | | 5.25 | | 2.62 | | | |
| Co: | | | | | | | | | | | | | | |
| P.p.m | | | | | | | | | 118 | | 59 | | | |
| Eq./m | | | | | | | | | 4.1 | | 2.0 | | | |
| $Li_2SO_4$ (gm. in slurry) | | | | | | | | | | | | 2.32 | | |
| Li: | | | | | | | | | | | | | | |
| P.p.m | | | | | | | | | | | | 14 | | |
| Eq./m | | | | | | | | | | | | 2.0 | | |
| LiOH (gm. in slurry) | | | | | | | | | | | | | 1.70 | |
| Li: | | | | | | | | | | | | | | |
| P.p.m | | | | | | | | | | | | | 14 | |
| Eq./m | | | | | | | | | | | | | 2.0 | |
| Responses: | | | | | | | | | | | | | | |
| Torque reading | | | | | 4.8 | 5.2 | 5.9 | 6.8 | 5.4 | 5.0 | 6.0 | 4.5 | 6.0 | 6.0 |
| Differential pressure (p.s.i.) | 393 | 575 | 446 | 556 | 300 | 340 | 355 | 408 | 176 | 305 | 287 | 298 | 368 | 400 |
| Polymer: shade | White | (2) | White | (2) | White | White | (2) | (2) | (3) | White | (4) | White | (2) | (2) |
| $\eta sp$ | 0.512 | 0.547 | 0.516 | 0.544 | 0.486 | 0.495 | 0.506 | 0.525 | 0.418 | 0.476 | 0.457 | 0.480 | 0.504 | 0.507 |
| COOH ($\mu$ eg./gm.) | 32 | 39 | 32 | 25 | 25 | 26 | 25 | 33 | 64 | 31 | 50 | 26 | 24 | 25 |
| DEG (mole percent) | 1.42 | 1.40 | 1.39 | 1.32 | 1.74 | 1.25 | 1.30 | 1.26 | 2.47 | 1.35 | 2.03 | 2.44 | 1.38 | 1.40 |

[1] Equivalents=(weight of metal×valence)/molecular weight.
[2] Very brown.
[3] Purple brown.
[4] Red brown.

In Example 1 only the antimony catalyst was used. In Example II lithium carbonate and antimony glycoloxide was used. Lithium carbonate, as well as lithium acetate, is known to be effective diethylene glycol suppressants. It will be noted that although a significant reduction in the diethylene glycol concentration in the fiber did not occur, the polymer viscosity rose from 0.51 to 0.55 $N_{sp}$, or, 0.04 unit. As shown in the table, the polymer color also changed from white to tan. In order to confirm that the catalytic activity was the result of the complementary effect of the ethylene glycoloxide and the lithium carbonate, the lithium salt was removed from the formulation in Example 3. As a result, the polymer viscosity reverted to 0.52 $N_{sp}$, and the color again became white. In Example 4, lithium acetate was tested and responded similarly to lithium carbonate at equivalent lithium concentrations. The succeeding examples show that similar results are obtained with sodium carbonate (Examples 6 and 7), potassium carbonate (Example 8), cobalt carbonate (Example 9 and 11), lithium sulfate (Example 12) and lithium hydroxide (Example 13). Examples 5 and 10 were controls. Although cobalt increased the obtainable polymer viscosity over that of antimony alone, cobalt promotes thermal decomposition of polymer; and the extent of the degradation is exemplified by the difference between the torque reading and the differential pressure in the transfer line. A torque reading of 5.4 to 6.0 corresponds to about a 0.50 to 0.51 $N_{sp}$ polymer. Because of the decomposition of the polymer with the cobalt additive, in Examples 9 and 11, the polymers had significantly lower molecular weight and higher carboxyl concentrations than the controls.

Also to be noted is a substantial difference between the anion of the lithium as exemplified by the essentially equivalent catalytic activity of the hydroxy and carbonate anions as opposed to the relatively inactive sulfate anion (Example 12) which yielded a polymer equivalent in viscosity and color to the controls.

Reactor and column product streams were sampled. The results are shown in the following table:

TABLE III.—CHEMICAL CHARACTERIZATION OF POLYMER STREAMS

| | Reactor product | | | Column product | | |
|---|---|---|---|---|---|---|
| Example | COOH ($\mu$ eq./gm.) | IV | $\left(\frac{Mole}{Mole\ TA}\times 100\right)$ | COOH ($\mu$ eq./gm.) | IV | $\left(\frac{Mole}{Mole\ TA}\times 100\right)$ |
| 5 | 665 | 0.09 | 1.15 | 45 | 0.26 | 1.27 |
| 6 | 678 | 0.09 | 1.04 | 61 | 0.27 | 1.10 |
| 7 | 630 | 0.10 | 1.10 | 59 | 0.26 | 1.19 |
| 8 | | | | 70 | 0.27 | 1.19 |
| 9 | 592 | | 1.39 | 117 | 0.27 | 2.34 |
| 10 | 664 | 0.10 | 1.23 | 88 | 0.26 | 1.35 |
| 11 | 633 | 0.09 | 1.28 | 83 | 0.27 | 1.82 |
| 12 | 643 | 0.09 | 2.37 | 59 | 1.27 | 2.36 |
| 13 | 668 | 0.09 | 1.05 | 64 | 0.26 | 1.26 |
| 14 | 627 | 0.09 | 1.17 | 60 | 0.26 | 1.25 |

Examples 15–21 show the effect on polymer viscosity of various catalyst concentrations (shown at Table II) using the combination of this invention. Reaction conditions were as described in previous examples. Also plotted in the figure, along corresponding concentration lines, are the same concentration of antimony used separately.

TABLE IV

| Example symbol: | Catalyst concentrations |
|---|---|
| 15 | 7.2 Sb, 2.0 K (9.2). |
| 16 | 9.2 Sb, 3.0 K (12.2). |
| 17 | 5.2 Sb, 3.0 K (8.2). |
| 18 | 5.2 Sb, 1.0 K (6.2). |
| 19 | 9.2 Sb, 1.0 K (10.2). |
| 20 | 7.2 Sb, 2.0 K (9.2). |
| 21 | 9.2 Sb, 4.0 K (13.2). |

Except as to Example 9, in which thermal decomposition of the column tails was evident by the relatively high carboxyl concentration, the chemical compositions of the pre-polymer streams were not sufficiently different to have affected the achievable polymer viscosity in the finisher. This shows that the increase in the achievable polymer in the finisher is related to the catalytic effect that certain metal compounds in conjunction with the antimony glycoloxide have on the transesterification of glycol terminated molecules.

The polymers produced in accordance with the instant invention are primarily designed for tire cord or other industrial application; and the off-white color of the polymers if of no particular significance so long as the thermal or hydrolytic stabilities of the yarns are acceptable. Where it is important that yarn color be white, the sodium salt would be the preferred additive since it was found to impart the least amount of color to the polymer. It is also possible that metal and antimony concentrations could be adjusted to an optimum which would give the maximum solution viscosity and a white color; however, such adjustment is not within the scope of this invention. The yarns produced in Examples 5–14 were tested for hydrolytic and thermal stability. Except for the yarn product of Example 9, which was badly degraded and of relatively low solution viscosity, all of the fibers, with or without metal additives, exhibited good and comparable stability.

I claim:

1. In the process for the production of polyester polymers having number average molecular weights above about 32,900, wherein dicarboxylic acids and glycols are esterified to form a prepolymer, and wherein said prepolymer is transesterified to produce said high molecular weight polyester polymer, the improvement comprising conducting the transesterification reaction in the presence of about 9.2–13.2 catalytic equivalents per million parts of said prepolymer or polymer of a combination of catalysts comprising about 2–4 catalytic equivalents of an alkali metal in the form of an alkali metal salt selected from the group consisting of lithium carbonate, lithium acetate, sodium carbonate, potassium carbonate and lithium hydroxide; and about 7–9 catalytic equivalents of antimony in the form of antimony glycoloxide.

2. The improvement of claim 1 wherein said member of the group consisting of lithium carbonate, lithium acetate, sodium carbonate, potassium carbonate, and lithium hydroxide is present during the esterification reaction.

3. The improvement of claim 1 wherein said antimony is present during the esterification reaction.

References Cited

UNITED STATES PATENTS

| 3,070,575 | 12/1962 | Cramer | 260—47 |
| 3,428,587 | 2/1969 | Piirma | 260—22 |
| 3,475,381 | 10/1969 | Price et al. | 260—75 |
| 3,451,970 | 6/1969 | Carter et al. | 260—75 |
| 3,050,548 | 8/1962 | Munro et al. | 260—475 |

OTHER REFERENCES

| 4,599 | 3/1966 | Japan. |
| 782,036 | 8/1957 | Great Britain. |
| 805,534 | 12/1958 | Great Britain. |

MELVIN GOLDSTEIN, Primary Examiner